US011200194B1

(12) United States Patent
Mindlin

(10) Patent No.: US 11,200,194 B1
(45) Date of Patent: Dec. 14, 2021

(54) MAGNETIC TAPE DRIVE

(71) Applicant: MagStor Inc., Columbus, OH (US)

(72) Inventor: Aleksandr Mindlin, Dublin, OH (US)

(73) Assignee: MagStor Inc., Columbus, OH (US)

( * ) Notice: Subject to any disclaimer, the term of this patent is extended or adjusted under 35 U.S.C. 154(b) by 0 days.

(21) Appl. No.: 16/283,638

(22) Filed: Feb. 22, 2019

Related U.S. Application Data

(60) Provisional application No. 62/634,597, filed on Feb. 23, 2018.

(51) Int. Cl.
*G06F 13/42* (2006.01)
*G11B 5/008* (2006.01)
*G06F 1/26* (2006.01)

(52) U.S. Cl.
CPC .......... *G06F 13/4282* (2013.01); *G06F 1/26* (2013.01); *G11B 5/00813* (2013.01); *G06F 2213/0036* (2013.01)

(58) Field of Classification Search
CPC .................................................... Y02D 10/14
See application file for complete search history.

(56) References Cited

U.S. PATENT DOCUMENTS

| 8,935,567 | B1 | 1/2015 | Martin et al. |
| 9,285,827 | B2 | 3/2016 | Breakstone et al. |
| 9,501,110 | B2 | 11/2016 | Heyd et al. |
| 9,678,910 | B2 | 6/2017 | Breakstone et al. |
| 9,811,483 | B2 * | 11/2017 | Maung .................... G06F 13/20 |
| 2006/0218434 | A1 * | 9/2006 | Solhjell ................ G06F 11/1456 714/6.12 |
| 2009/0097153 | A1 * | 4/2009 | Day .......................... G11B 5/56 360/76 |
| 2012/0102251 | A1 * | 4/2012 | Jan ......................... G06F 13/387 710/300 |
| 2013/0058030 | A1 | 3/2013 | Mabon |
| 2014/0028689 | A1 | 1/2014 | Teng |

(Continued)

OTHER PUBLICATIONS

"LaCie Bolt3 Review", PC Magazine Website, Web page <https://www.pcmag.com/reviews/lacie-bolt3>, 8 pages, dated Mar. 7, 2017, retrieved from www.pcmag.com website on Feb. 17, 2020.

(Continued)

*Primary Examiner* — Henry Tsai
*Assistant Examiner* — Juanito Borromeo
(74) *Attorney, Agent, or Firm* — The Law Office of Patrick F. O'Reilly III, LLC

(57) ABSTRACT

Peripheral magnetic tape drives are disclosed herein. The disclosed peripheral magnetic tape drive comprises: a housing; a SAS compliant tape drive module; a power supply and a USB-C to SAS assembly. The SAS compliant tape drive module, the power supply and the USB-C to SAS assembly are disposed within the housing. The power supply module is operatively coupled to the tape drive module to supply +12V and +5V power thereto. The USB-C to SAS assembly is operatively connected to the tape drive module using a SAS data channel. The USB-C to SAS assembly is configured to enable the peripheral magnetic tape drive to interface a USB-C compliant device with the SAS compliant tape drive module. The USB-C to SAS assembly is further operatively coupled to the power supply to receive +12V power. The USB-C to SAS assembly may send and receive data using a Thunderbolt® 3 protocol.

16 Claims, 8 Drawing Sheets

(56) References Cited

U.S. PATENT DOCUMENTS

2015/0348580 A1* 12/2015 Van Hoff .............. G11B 19/20
                                                          348/38
2016/0234178 A1   8/2016 Jenkins et al.
2017/0235697 A1*  8/2017 Beeson ............... G06F 13/4022
                                                          710/110

OTHER PUBLICATIONS

"Akitio Thunder3 Duo Pro", Akitio Website, Web page <https://www.akitio.com/desktop-storage/thunder3-duo-pro>, 10 pages, dated at least as early as Sep. 2017, retrieved from www.akitio.com website on Feb. 17, 2020.

"Review: CalDigit's TS3 and TS3 Lite Thunderbolt 3 Docks Offer Solid MacBook Pro Expansion Options", MacRumors Website, Web page <https://www.macrumors.com/review/caldigit-ts3-thunderbolt-3-docks/>, 12 pages, dated Jun. 11, 2017, retrieved from www.macrumors.com website on Feb. 17, 2020.

* cited by examiner

MAGNETIC TAPE DRIVE

CROSS-REFERENCE TO RELATED APPLICATIONS

This patent application claims priority to, and incorporates by reference in its entirety, U.S. Provisional Patent Application No. 62/634,597, entitled "Magnetic Tape Drive", filed on Feb. 23, 2018.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to computer peripheral devices. More particularly, the present invention relates to an external magnetic tape drive employing a Universal Serial Bus Type-C (USB-C) connector.

Background and Description of Related Art

Peripheral devices for use with desktop computer systems are well known. Common peripheral devices include printers, monitors, and disk drives. In some cases, users need a way to back up and/or store a massive amount of data. Magnetic tapes have long been a preferred medium for such large data stores.

Presently, peripheral magnetic tape drives employ relatively slow and low-bandwidth data transfer protocols with bulky connectors. Such tape drives are limited by the existing interfacing connection of a tape drive to a desktop computer running Microsoft Windows or Apple's MAC OS 10+ operating systems. Traditionally tape drives use a SAS (serial-attached-SCSI) connection, and in order to use such a tape drive, one would need an expansion PCI-e SAS interface card inserted into one's computer, assuming there is an available and powerful enough expansion bay. Unfortunately, laptops do not have any PCI-e expansion capabilities.

Accordingly, there is a need for a peripheral magnetic tape drive that can interface with a laptop computer without additional hardware. The tape drive of the present application allows a user easily to connect to a Desktop or Laptop computer with a USB-C connector rather than the uncommon SAS adapter. The tape drive of the present application is further compatible with a protocol referred to commercially as Thunderbolt® 3.

SUMMARY OF EXAMPLE EMBODIMENTS

Accordingly, the present invention is directed to an improved magnetic tape drive device that substantially obviates one or more problems resulting from the limitations and deficiencies of the related art.

According to a first embodiment of the present application, Applicant discloses a peripheral magnetic tape drive. The tape drive comprises: a housing; a SAS compliant tape drive module; a power supply; and a USB-C to SAS assembly. The SAS-compliant tape drive module; the power supply; and the USB-C to SAS assembly are disposed within the housing.

The power supply is operatively coupled to the tape drive module to supply +12V and +5V power. The power supply also is operatively coupled to the USB-C to SAS assembly to supply +12V power.

The USB-C to SAS assembly is operatively coupled to the tape drive module using a SAS data channel. The USB-C to SAS assembly is configured to enable the peripheral magnetic tape drive to interface a USB-C compliant device with the SAS compliant tape drive module.

BRIEF DESCRIPTION OF THE DRAWINGS

The invention will now be described, by way of example, with reference to the accompanying drawings, which are incorporated in and constitute a part of the specification, in which.

DRAWING REFERENCE NUMERALS

Figure 1:
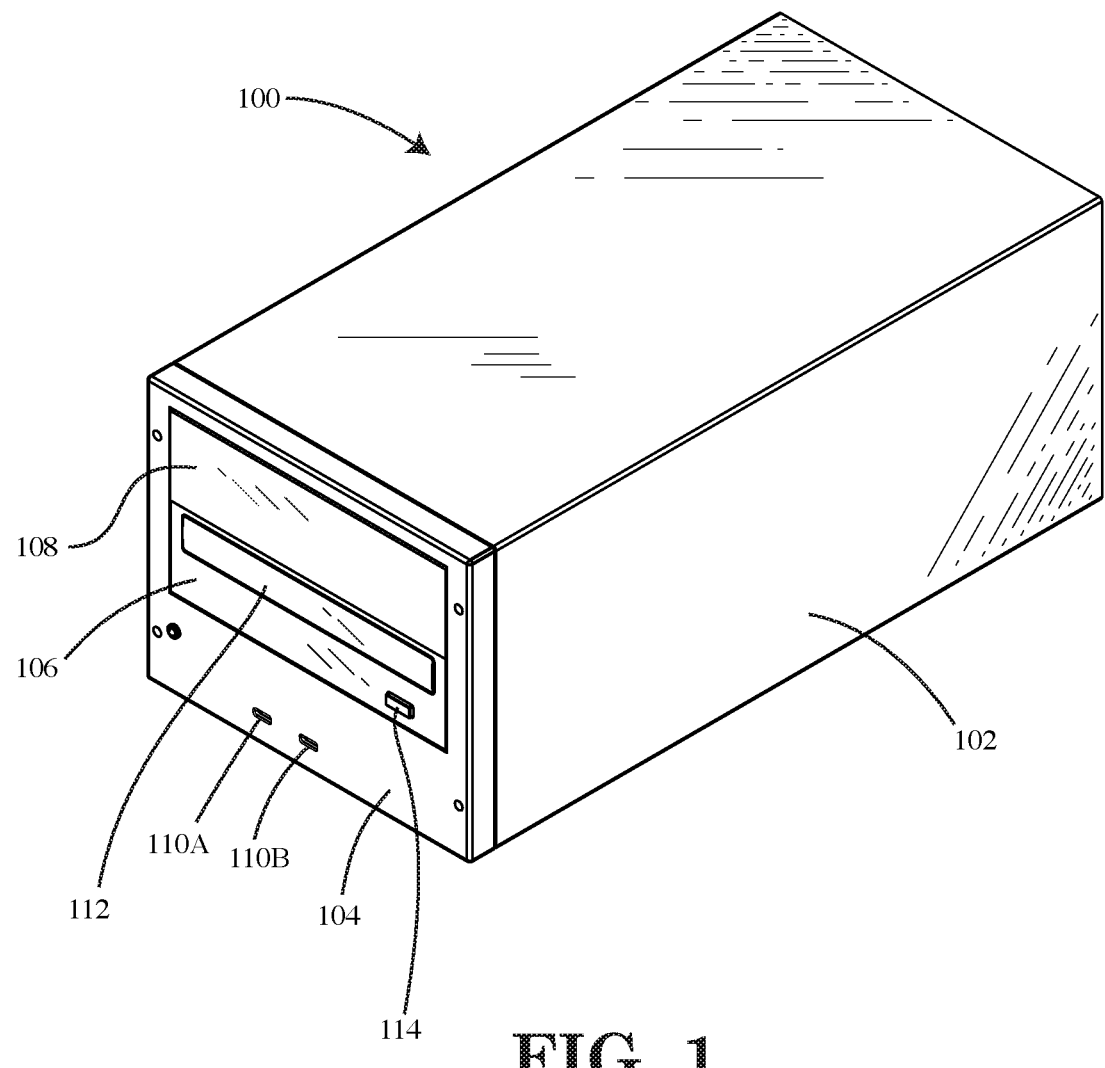
FIG. 1 is an orthographic top view of a first example magnetic tape drive.

The following reference characters identify the associated elements depicted in the drawings describing the present invention:
100 Magnetic Tape Drive
106 Tape Drive Module
102 Outer Cover
108 Blank Insert
104 Front Bezel
110A USB-C Receptacle 1
110B USB-C Receptacle 2
308 Aperture 1 (PS Cooling Fan)
112 Cartridge Receiving Slot
310 Aperture 2 (Cooling Fan)
114 Cartridge Ejection Button
312 Finger Guard
120 TB3/PCI-e Card
502 Chassis Assembly
122 PCI-e/SAS Card
504 Grate 202A-D Feet
802 Power Supply
302 Rear Plate
804 Cooling Fan
304 Power Receptacle
806 Divider
306 Power Switch
808 Front Plate

DETAILED DESCRIPTION

To address the deficiencies of the prior art, the present application discloses an improved magnetic tape drive. The magnetic tape drive of the present application embodies several improvements over the prior art. According to one aspect of the present application, the disclosed magnetic tape drive may comprise a Thunderbolt® 3 interface which allows approximately four times the data transfer bandwidth of prior art tape drives. According to another aspect of the present application, the disclosed magnetic tape drive may use a connection to daisy chain other external devices, while also supplying such devices with up to 100 W of power.

Referring now to FIG. 1, there is shown an orthographic view of an example magnetic tape drive 100. Example tape drive 100 comprises an outer cover 102 and a front bezel 104 to partially enclose, retain, and protect interior elements of magnetic tape drive 100. Outer cover 102 and front bezel 104 may be constructed, for example, from steel pre-plating having a thickness of 1.0 mm. One of ordinary skill will recognize that outer cover 102 and front bezel 104 could be constructed from various other materials such as die-cast aluminum, or molded plastic.

Tape drive 100 further comprises a tape drive module 106, and two USB-C cable receptacles 110A and 110B. Tape drive module may comprise, for example, a tape drive module compatible with Linear Tape-Open (LTO) magnetic tape media. Tape drive 100 is capable of supporting a second tape drive module (not shown). When tape drive 100 is configured to include a single tape drive module 106, tape drive 100 may comprise a blank insert 108 to act as a placeholder for a second tape drive module and to protect the interior elements of tape drive 100.

Figure 2:
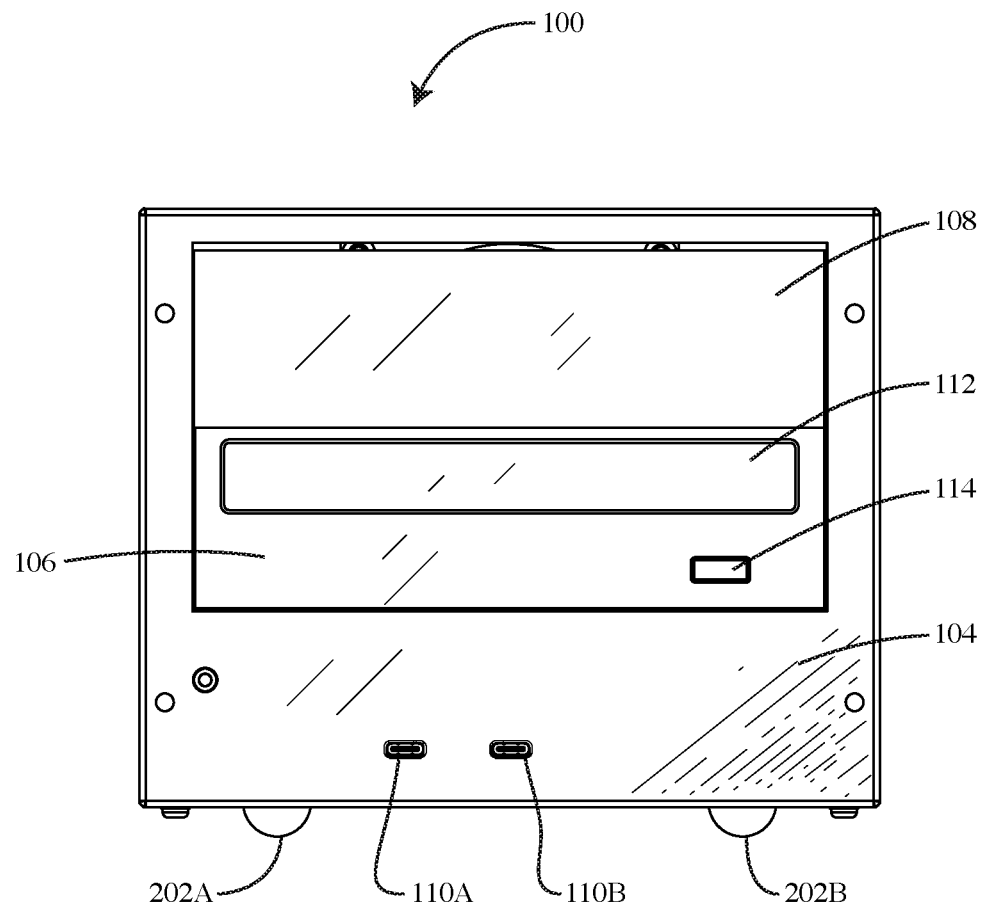
FIG. 2 is a front side view of the first example magnetic tape drive.

Referring now to FIG. 2, tape drive module 106 is operative to read and write magnetic tape cartridges (not shown) which may store large amounts of digital data. Tape drive module 106 receives and ejects a magnetic tape cartridge via cartridge receiving slot 112 which may comprise a spring loaded, protective door. A user may eject the magnetic tape cartridge from tape drive module 106 using cartridge ejection button 114. Front feet 202A and 202B, which partially support magnetic tape drive 100, are also illustrated in FIG. 2.

Magnetic tape drive 100 employs a Thunderbolt® 3 (TB3) communication interface to communicate with a personal computer and/or other devices. Magnetic tape drive 100 further comprises receptacles 110A and 110B for receiving Universal Serial Bus Type-C (USB-C) connectors. Receptacles 110A and 110B provide access to PCI-e to TB3 card 120 (best shown in FIG. 8) which converts between a Thunderbolt® 3 interface protocol and a Peripheral Component Interconnect Express (PCI-e) interface protocol. Card 120 is operatively coupled to SAS/PCI-e card 122 which in turn is operatively coupled to tape drive module 106, thereby enabling tape drive module 106 to communicate with devices supporting the Thunderbolt® 3 interface. The SAS/PCI-e card 122 converts between a Peripheral Component Interconnect Express (PCI-e) interface protocol and a serial-attached-SCSI (SAS) interface protocol. As known in the art, SCSI refers to a Small Computer System Interface. PCI-e to TB3 card 120 may comprise an adapter card such as Areca Technology Corporation model no. ARC-4050-T3, for example. SAS/PCI-e card 122 may comprise an adapter card such as Areca Technology Corporation model no. ARC-1330-8T, for example.

Figure 3:
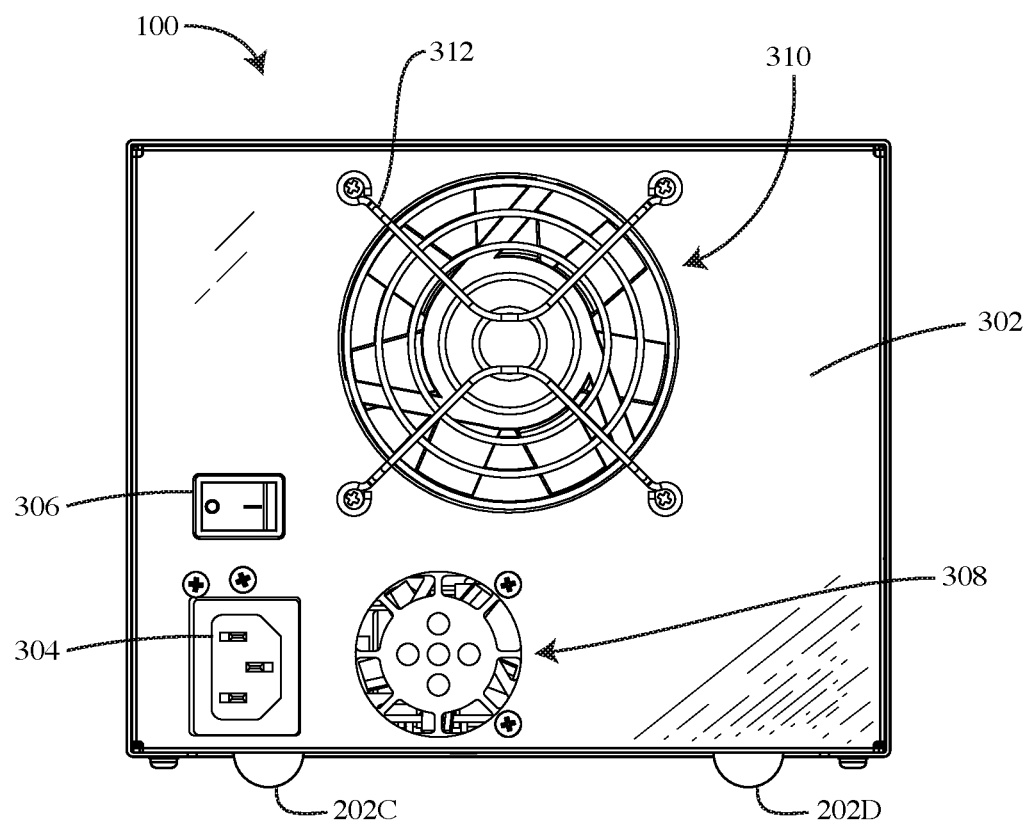
FIG. 3 is a rear side view of the first example magnetic tape drive.

Referring now to FIG. 3, magnetic tape drive 100 further comprises a rear plate 302 covering the rear portion of the interior of magnetic tape drive 100. As illustrated in FIG. 3, magnetic tape drive 100 further comprises a power receptacle 304 for receiving a cord supplying tape drive 100 with 120V external power. Power switch 306 may be integrated into, or provided separate from, power supply 802 (best shown in FIG. 8) for turning tape drive 100 on and off. Power supply 802 may comprise a power supply such as Seasonic model no. SSP-250SUB, for example. Rear plate 302 comprises two exhaust apertures 308 and 310 for dissipating heat from tape drive 100. Aperture 308 enables power supply 802 to dissipate heat using an integrated power supply cooling fan. Aperture 310 enables heat to be dissipated from a cooling fan 804 (best shown in FIG. 8) located within tape drive 100. A finger guard 312 or other protective grate may be used to cover aperture 310.

Figure 4:
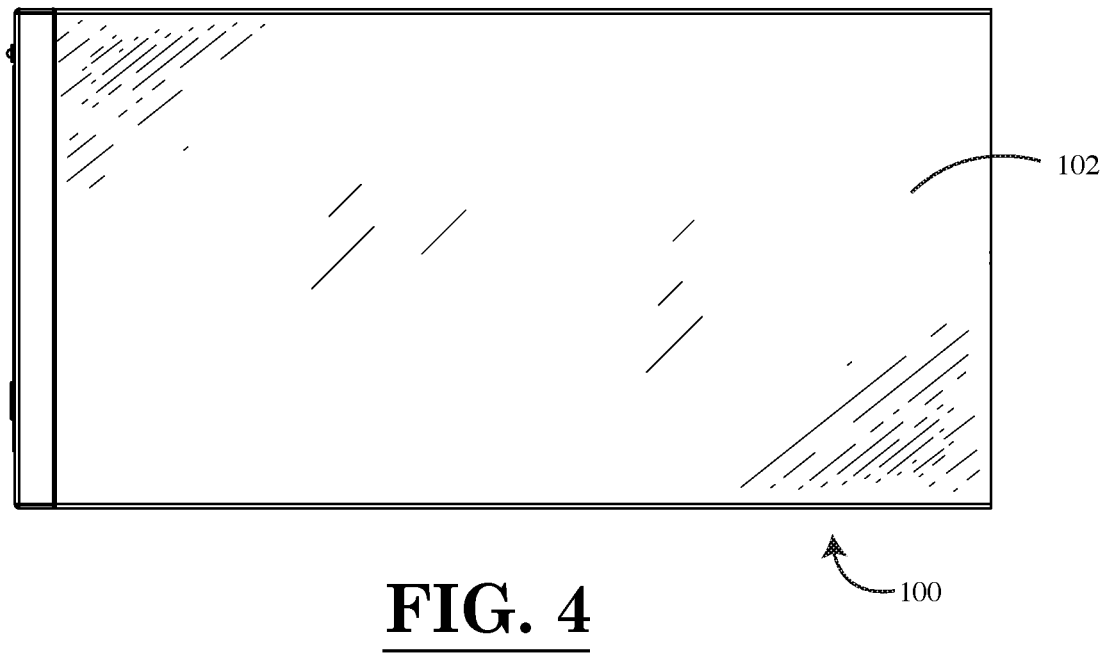
FIG. 4 is a top plan view of the first example magnetic tape drive.

Referring now to FIG. 4 there is depicted a top plan view of magnetic tape drive 100. As illustrated, magnetic tape drive 100 comprises top plate 102.

Figure 5:
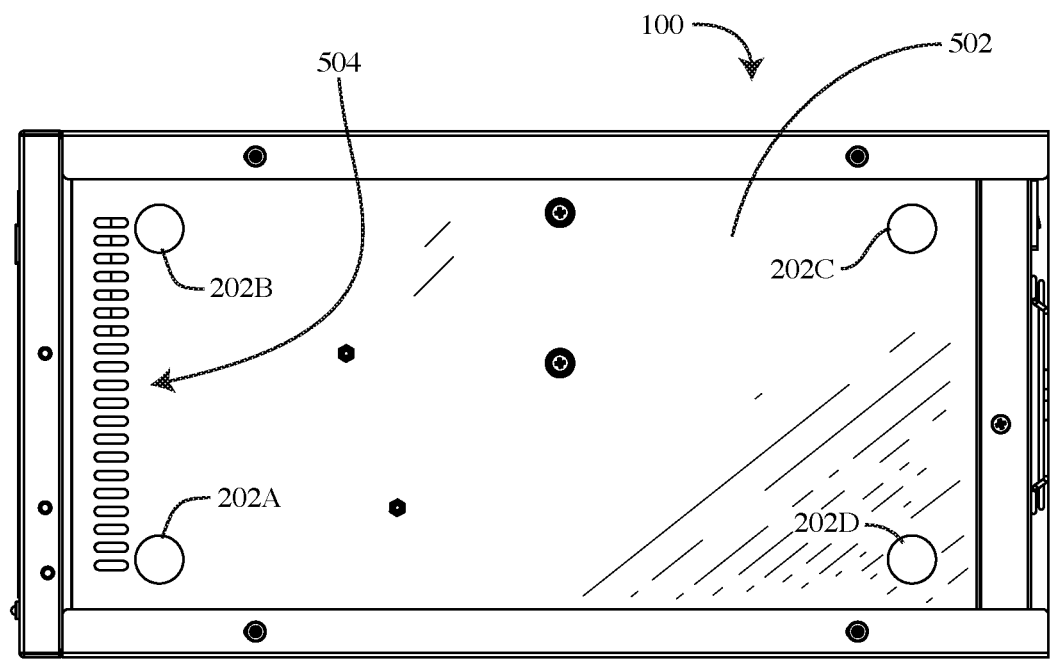
FIG. 5 is a bottom plan view of the first example magnetic tape drive.

Referring now to FIG. 5 there is depicted a bottom plan view of magnetic tape drive 100. As illustrated, magnetic tape drive 100 comprises a chassis assembly 502. Feet 202A-D may be attached to chassis assembly 502, and chassis assembly 502 may include a grate 504 to maintain proper air flow through the device to cool internal components. In the example embodiment, grate 504 may operate as an air intake for the cooling fans described above.

Figure 6:
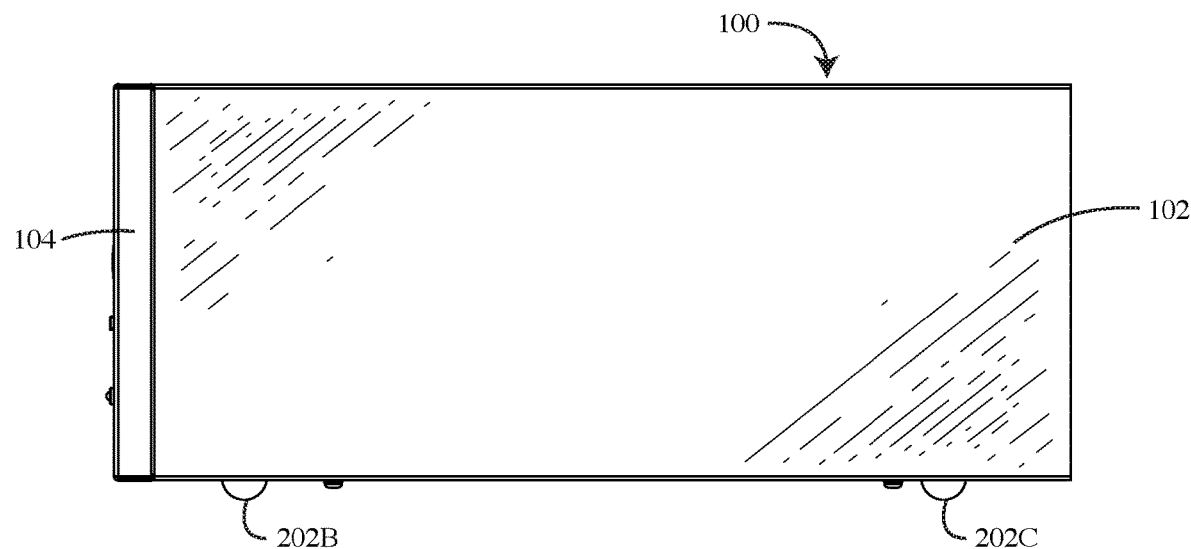
FIG. 6 is a right side view of the first example magnetic tape drive.
Figure 7:
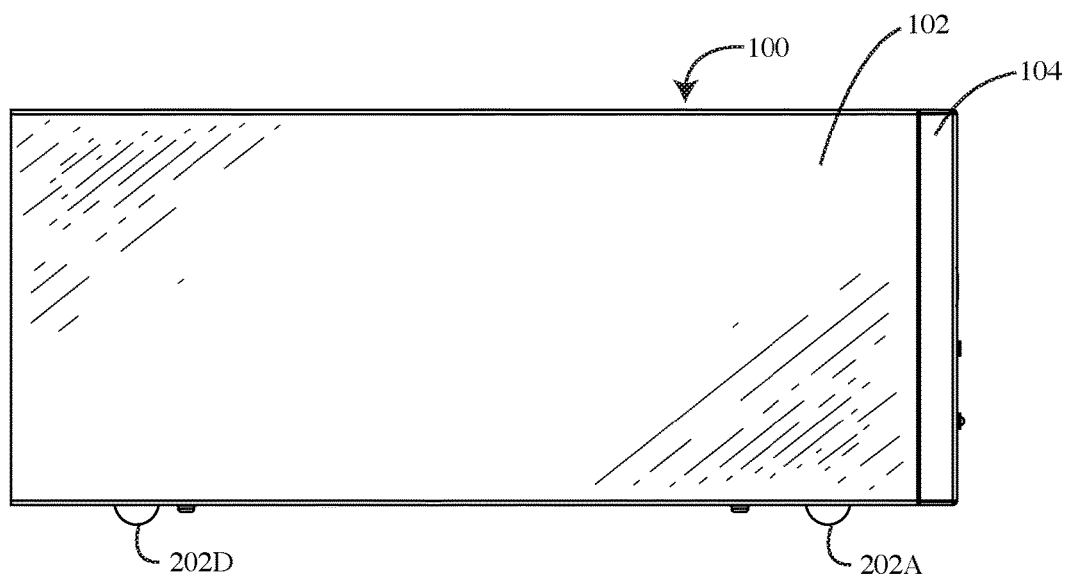
FIG. 7 is a left side view of the first example magnetic tape drive.

FIGS. 6 and 7 respectively depict right and left side views of magnetic tape drive 100.

Figure 8:
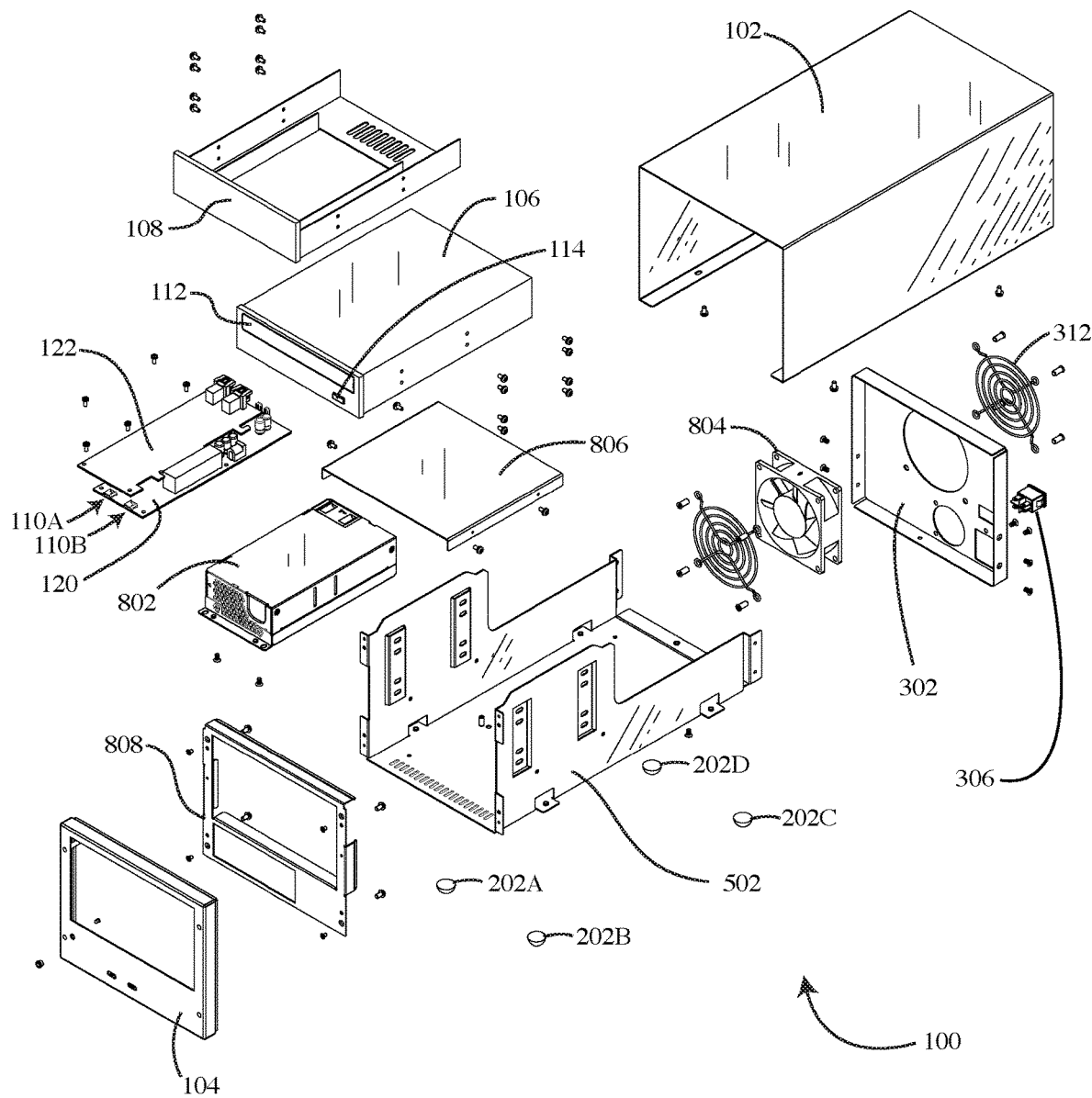
FIG. 8 is a 3D exploded view of the first example magnetic tape drive.

Referring now to FIG. 8, there is depicted a 3D exploded view of magnetic tape drive 100. FIG. 8 illustrates the cooperation and relative example positions of the components of magnetic tape drive 100. As shown, FIG. 8 depicts divider plate 806 which is configured to separate tape drive module 106 and power supply 802. As shown tape drive 100 further comprises a front plate 808 for securing front bezel 104 to chassis assembly 502.

Figure 9:
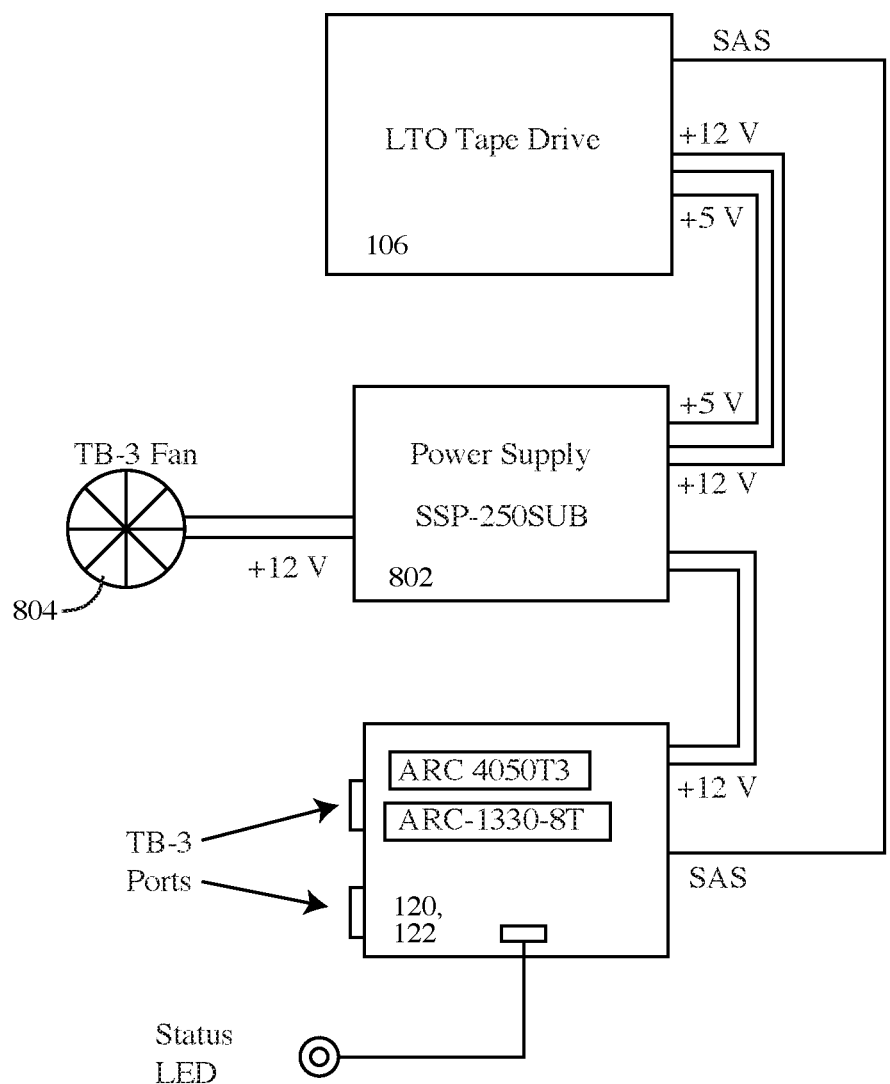
FIG. 9 is a schematic wiring diagram of the first example magnetic tape drive.

Referring now to FIG. 9, there is depicted a schematic diagram of the components of magnetic tape drive 100. As illustrated, power supply 802 supplies power to various components of tape drive 100.

Accordingly, power supply 802 supplies +12V power to cooling fan 804. Power supply 802 further supplies +12V power to SAS/PCI-e card 122. Power supply 802 also supplies +12V power to the tape drive module 106 to operate an internal motor and +5V power to the tape drive module 106 to operate a logic board. As illustrated, SAS/PCI-e card 122 supplies a SAS data signal to/from tape drive module 106. In the example embodiment, the 12-volt (+12V) and 5-volt (+5V) power supplied by the power supply 802 is direct current (DC) power.

Figure 10:
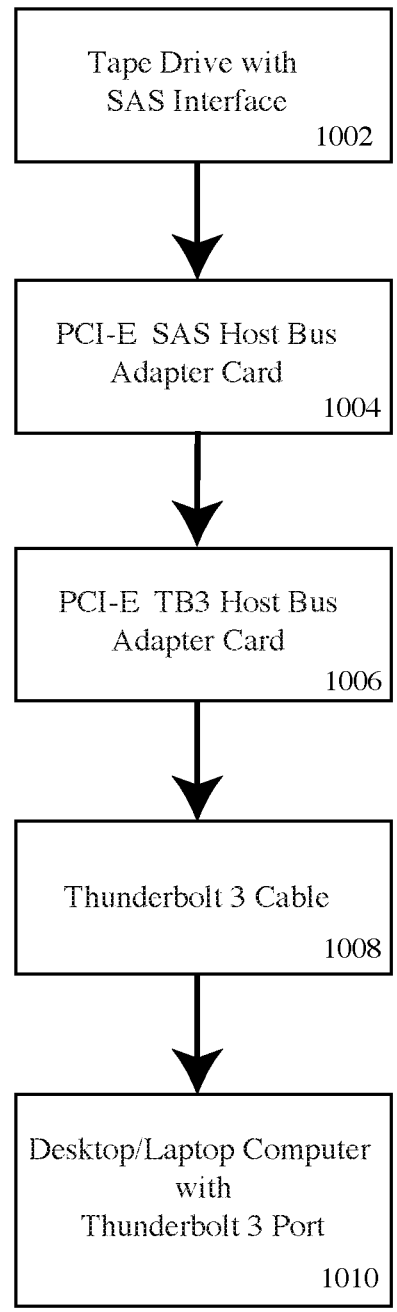
FIG. 10 is a schematic diagram illustrating the first example magnetic tape drive connected to a computer.

Referring now to FIG. 10, there is depicted a schematic diagram illustrating the magnetic tape drive 100 connected to a computer. As illustrated at blocks 1002 and 1004, the tape drive module 106 is connected to the SAS/PCI-e adapter card. At blocks 1004 and 1006, the SAS/PCI-e interface is connected to the PCI-e/TB3 adapter card. At blocks 1006-1010, a Thunderbolt® 3 cable, or equivalent USB-C cable, connects the PCI-e/TB3 adapter card to a desktop or laptop computer.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A peripheral magnetic tape drive, said tape drive comprising:
    a housing;
    a SAS-compliant tape drive module disposed within the housing, the SAS-compliant tape drive module being compatible with LTO magnetic tape media, and the SAS-compliant tape drive module having an SAS connector;
    a Thunderbolt® 3 (TB3) to SAS assembly disposed within the housing, the TB3 to SAS assembly operatively connected to the SAS connector of the tape drive module using a SAS data channel, the TB3 to SAS assembly having at least one TB3 port accessible from outside the housing, the TB3 to SAS assembly configured to enable the peripheral magnetic tape drive to interface a TB3-compliant device with the SAS-compliant tape drive module via the at least one TB3 port; and
    a power supply disposed within the housing, the power supply operatively coupled to the tape drive module and the TB3 to SAS assembly so as to supply power for the tape drive module and the TB3 to SAS assembly.

2. The peripheral magnetic tape drive according to claim 1, further comprising a cooling fan disposed within the housing, the cooling fan operatively connected to the power supply so as to receive power from the power supply.

3. The peripheral magnetic tape drive according to claim 1, wherein the TB3-compliant device comprises a TB3-compliant laptop computer or a TB3-compliant desktop computer.

4. The peripheral magnetic tape drive according to claim 1, wherein the TB3 to SAS assembly sends and receives data using a Thunderbolt® 3 interface protocol.

5. A peripheral magnetic tape drive, said tape drive comprising:
    a housing;
    a SAS-compliant tape drive module disposed within the housing, the SAS-compliant tape drive module being compatible with LTO magnetic tape media, and the SAS-compliant tape drive module having an SAS connector;
    a power supply operatively coupled to the tape drive module to supply +12V and +5V power; and
    a Thunderbolt® 3 (TB3) to SAS assembly operatively connected to the SAS connector of the tape drive module using a SAS data channel, the TB3 to SAS assembly having at least one TB3 port accessible from outside the housing, the TB3 to SAS assembly configured to enable the peripheral magnetic tape drive to interface a TB3-compliant device with the SAS-compliant tape drive module via the at least one TB3 port, the TB3 to SAS assembly sending and receiving data using a Thunderbolt® 3 (TB3) interface protocol, the TB3 to SAS assembly further operatively coupled to the power supply to receive +12V power.

6. The peripheral magnetic tape drive according to claim 5, further comprising a cooling fan disposed within the housing, the cooling fan operatively connected to the power supply, the cooling fan receiving +12V power from the power supply.

7. The peripheral magnetic tape drive according to claim 5, wherein the power supply comprises a 250 watt power supply.

8. The peripheral magnetic tape drive according to claim 5, wherein the TB3 to SAS assembly comprises a SAS/PCI-e card for supplying a SAS data signal to, and from the SAS-compliant tape drive module, and the TB3 to SAS assembly further comprises a PCI-e to TB3 card for converting between the TB3 interface protocol and a PCI-e interface protocol.

9. A peripheral magnetic tape drive, said tape drive comprising:
    a housing;
    a SAS-compliant tape drive module disposed within the housing, the SAS-compliant tape drive module having an SAS connector;
    a Thunderbolt® 3 (TB3) to SAS assembly disposed within the housing, the TB3 to SAS assembly operatively connected to the SAS connector of the tape drive module using a SAS data channel, the TB3 to SAS assembly having at least one TB3 port accessible from outside the housing, the TB3 to SAS assembly configured to enable the peripheral magnetic tape drive to interface a TB3-compliant device with the SAS-compliant tape drive module via the at least one TB3 port, the TB3 to SAS assembly sending and receiving data using a Thunderbolt® 3 (TB3) interface protocol, the TB3 to SAS assembly comprising a SAS/PCI-e card for supplying a SAS data signal to, and from the SAS-compliant tape drive module, and the TB3 to SAS assembly further comprising a PCI-e to TB3 card for converting between the TB3 interface protocol and a PCI-e interface protocol; and a power supply disposed within the housing, the power supply operatively coupled to the tape drive module and the TB3 to SAS assembly so as to supply power for the tape drive module and the TB3 to SAS assembly.

10. The peripheral magnetic tape drive according to claim 9, wherein the SAS-compliant tape drive module is compatible with LTO magnetic tape media.

11. The peripheral magnetic tape drive according to claim 9, further comprising a cooling fan disposed within the housing, the cooling fan operatively connected to the power supply so as to receive power from the power supply.

12. The peripheral magnetic tape drive according to claim 9, wherein the TB3-compliant device comprises a TB3-compliant laptop computer or a TB3-compliant desktop computer.

13. The peripheral magnetic tape drive according to claim 9, wherein the power supply is operatively coupled to the tape drive module to supply +12V and +5V power.

14. The peripheral magnetic tape drive according to claim 1, wherein the at least one TB3 port of the TB3 to SAS assembly is located on a side of the housing beneath the tape drive module.

15. The peripheral magnetic tape drive according to claim 5, wherein the at least one TB3 port of the TB3 to SAS assembly is located on a side of the housing beneath the tape drive module.

16. The peripheral magnetic tape drive according to claim 9, wherein the at least one TB3 port of the TB3 to SAS assembly is located on a side of the housing beneath the tape drive module.

* * * * *